United States Patent
Wallace et al.

(10) Patent No.: US 10,761,565 B2
(45) Date of Patent: Sep. 1, 2020

(54) MULTI-ANGLE STAND FOR AN INFORMATION HANDLING DEVICE

(71) Applicant: Lenovo (Singapore) Pte. Ltd., Singapore (SG)

(72) Inventors: Brian William Wallace, Wake Forest, NC (US); Seth Doughton Rumsey, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 156 days.

(21) Appl. No.: 14/164,453

(22) Filed: Jan. 27, 2014

(65) Prior Publication Data

US 2015/0212542 A1 Jul. 30, 2015

(51) Int. Cl.
G06F 1/16 (2006.01)

(52) U.S. Cl.
CPC ............ *G06F 1/1628* (2013.01); *G06F 1/166* (2013.01); *G06F 1/1626* (2013.01); *G06F 2200/1633* (2013.01)

(58) Field of Classification Search
CPC ................................ G06F 1/1628; G06F 1/166
See application file for complete search history.

(56) References Cited

U.S. PATENT DOCUMENTS

| | | | | |
|---|---|---|---|---|
| 7,735,644 B2 * | 6/2010 | Sirichai | ..................... | A45F 5/02 206/320 |
| 8,720,843 B1 * | 5/2014 | Chen | ..................... | G06F 1/1613 206/305 |
| 8,746,449 B2 * | 6/2014 | Gallagher | ............ | F16M 11/105 206/320 |
| 9,149,100 B2 * | 10/2015 | Marshall | ................ | A45C 11/00 |
| 9,287,917 B1 * | 3/2016 | Tages | .................... | H04B 1/3888 |
| 2009/0073337 A1 * | 3/2009 | Liou | ...................... | G02F 1/1323 349/58 |
| 2009/0178938 A1 * | 7/2009 | Palmer | ..................... | A45C 5/03 206/45.23 |
| 2012/0037285 A1 * | 2/2012 | Diebel | .................. | G06F 1/1628 150/165 |
| 2012/0044638 A1 * | 2/2012 | Mongan | ................ | G06F 1/1626 361/679.55 |
| 2012/0217174 A1 * | 8/2012 | Ting | ...................... | G06F 1/1628 206/45.2 |
| 2013/0016467 A1 * | 1/2013 | Ku | ........................ | G06F 1/1626 361/679.08 |
| 2013/0313142 A1 * | 11/2013 | Wen | ...................... | A45C 11/00 206/320 |

* cited by examiner

*Primary Examiner* — Nidhi Thaker

(74) *Attorney, Agent, or Firm* — Ference & Associates LLC

(57) ABSTRACT

An aspect provides an apparatus, including: a receptacle for an information handling device having a user display, the receptacle having at least a first side, a second side, and at least one edge, wherein the first side of the receptacle has at least one opening therein through which the information handling device is insertable there-through and the second side forms a back of the receptacle; a protrusion from the second side of the receptacle pivotably attached to the second side of the receptacle and of sufficient length such that the protrusion will wrap around an edge of the receptacle and cover the opening in the first side of the receptacle; and wherein at least a portion of the protrusion comprises thereon a mechanism that permits the edge of the receptacle to be held in position. Other aspects are described and claimed.

16 Claims, 4 Drawing Sheets

MULTI-ANGLE STAND FOR AN INFORMATION HANDLING DEVICE

BACKGROUND

Information handling devices ("devices") come in a variety of forms, for example tablet computing devices, smart phones, and the like. Users of many of these devices prefer to place the devices inside a case, which offers protection to the device from scratches or other damage that may occur when the device is not in use. When in use, however, a user often prefers to place the information handling device at an angle for easier viewing.

BRIEF SUMMARY

In summary, one aspect provides an apparatus, comprising: a receptacle for an information handling device having a user display, the receptacle having at least a first side, a second side, and at least one edge, wherein the first side of the receptacle has at least one opening therein through which the information handling device is insertable there-through and the second side forms a back of the receptacle; a protrusion from the second side of the receptacle pivotably attached to the second side of the receptacle and of sufficient length such that the protrusion will wrap around an edge of the receptacle and cover the opening in the first side of the receptacle; and wherein at least a portion of the protrusion comprises thereon a mechanism that permits the edge of the receptacle to be held in position.

Another aspect provides a system, comprising: an information handling device comprising: a display; a processor; and a memory device storing instructions executable by the processor to operatively couple the display to the processor; wherein the information handling device is contained with a receptacle, the receptacle having at least a first side, a second side, and at least one edge, wherein the first side of the receptacle has at least one opening therein through which the information handling device is insertable there-through and the second side forms a back of the receptacle; wherein a protrusion from the second side of the receptacle is pivotably attached to the second side of the receptacle and of sufficient length such that the protrusion will wrap around an edge of the receptacle and cover the opening in the first side of the receptacle; and wherein at least a portion of the protrusion comprises thereon a mechanism that permits the edge of the receptacle to be held in position.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
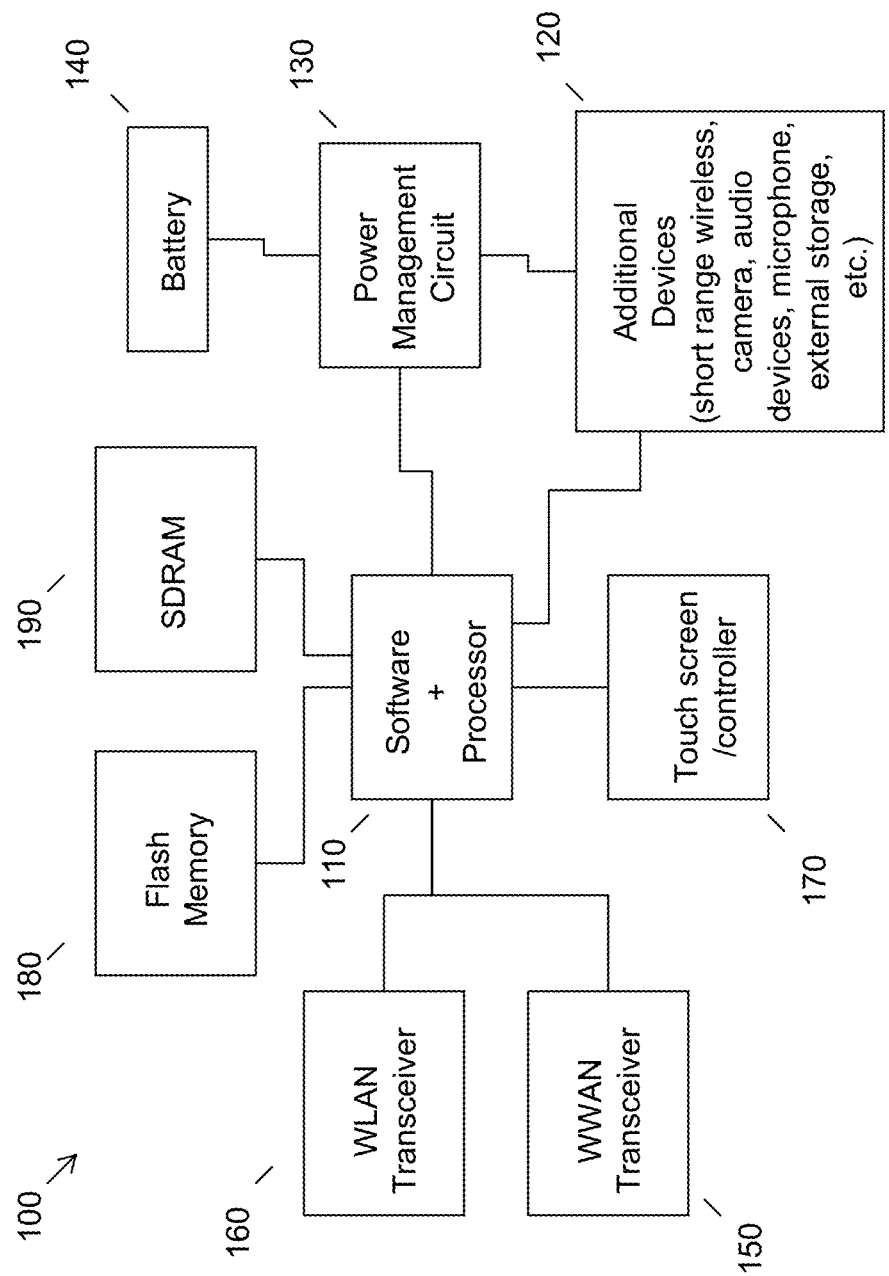
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

While increasingly common, devices such as tablet computing devices, smart phones, and the like are susceptible to scratches or other damage that may occur when the device is not in use. To protect devices from such damage, many users prefer to place a device within a protective case. When using a device users may prefer to place the information handling device at an angle for easier viewing. There is, however, no standard preferred viewing angle and the preferred viewing angle is one of personal choice.

Devices can take any number of a wide variety of shapes and form, but in an embodiment comprises a processor and a touch-sensitive or pressure-sensitive screen which a user may manually manipulate to provide inputs to, and from which the user may receive outputs. The device may be generally flat and planar, and rectangular in top view, and in an embodiment does not have a keyboard.

Accordingly, embodiments provide systems and products that allow a user to protect a device from damage when the device is not in use and yet permit the device to be placed at a preferred viewing angle when in use. This allows users to select the viewing angle that is most appropriate for a given situation. A user may wish to vary the viewing angle of the device for any number of reasons, including background (ambient) lighting, ease of interaction with the device (e.g., playing a game), and sharing the information being displayed with another person. As such, any number of viewing angles may be desirable by a user.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally devices 120 are commonly included, e.g., an image sensor such as a camera. System 100 often includes a touch screen 170 for data input and display/rendering. System 100 also typically includes various memory devices, for example flash memory 180 and SDRAM 190.

Figure 2:
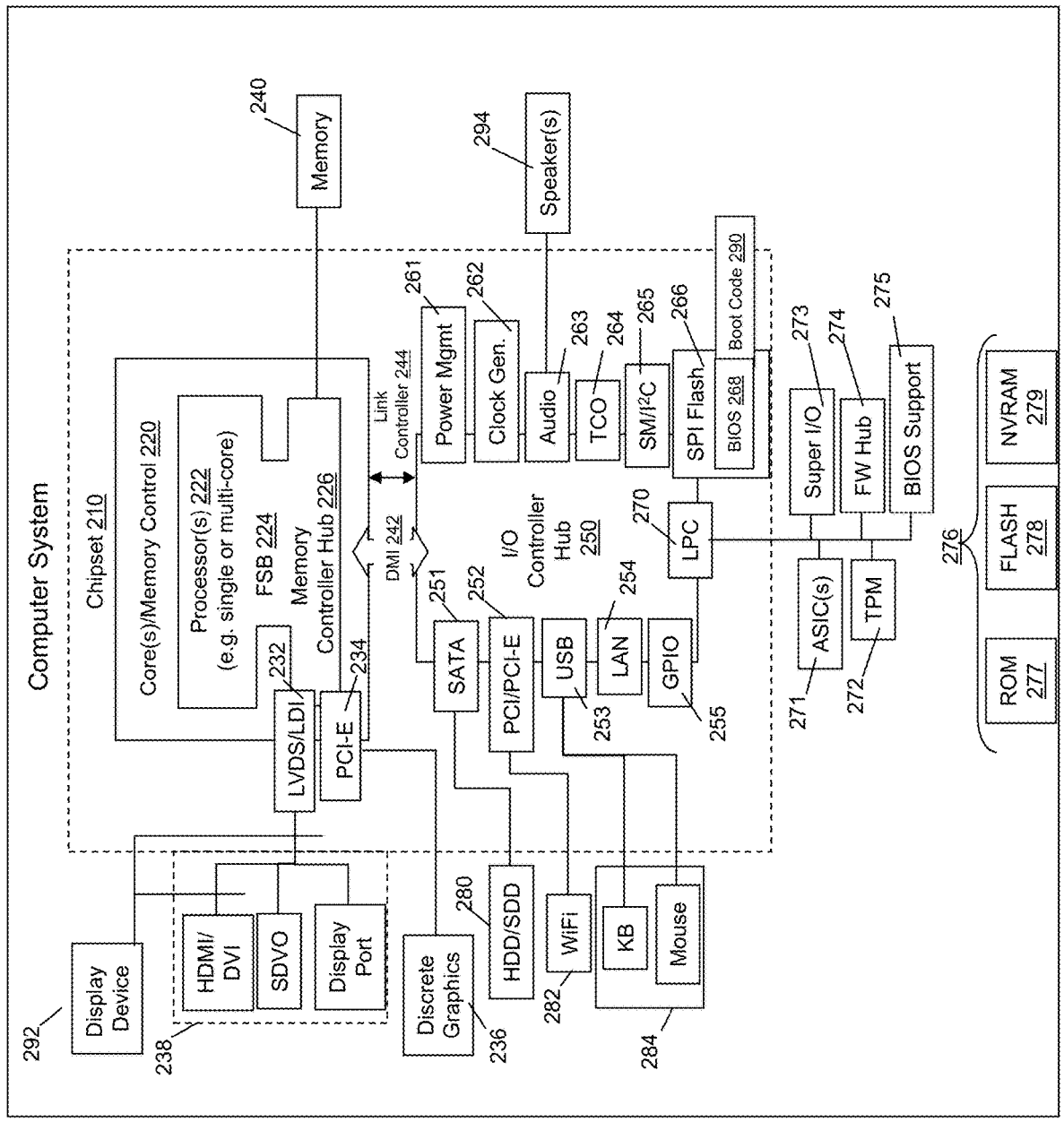
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Figure 3:
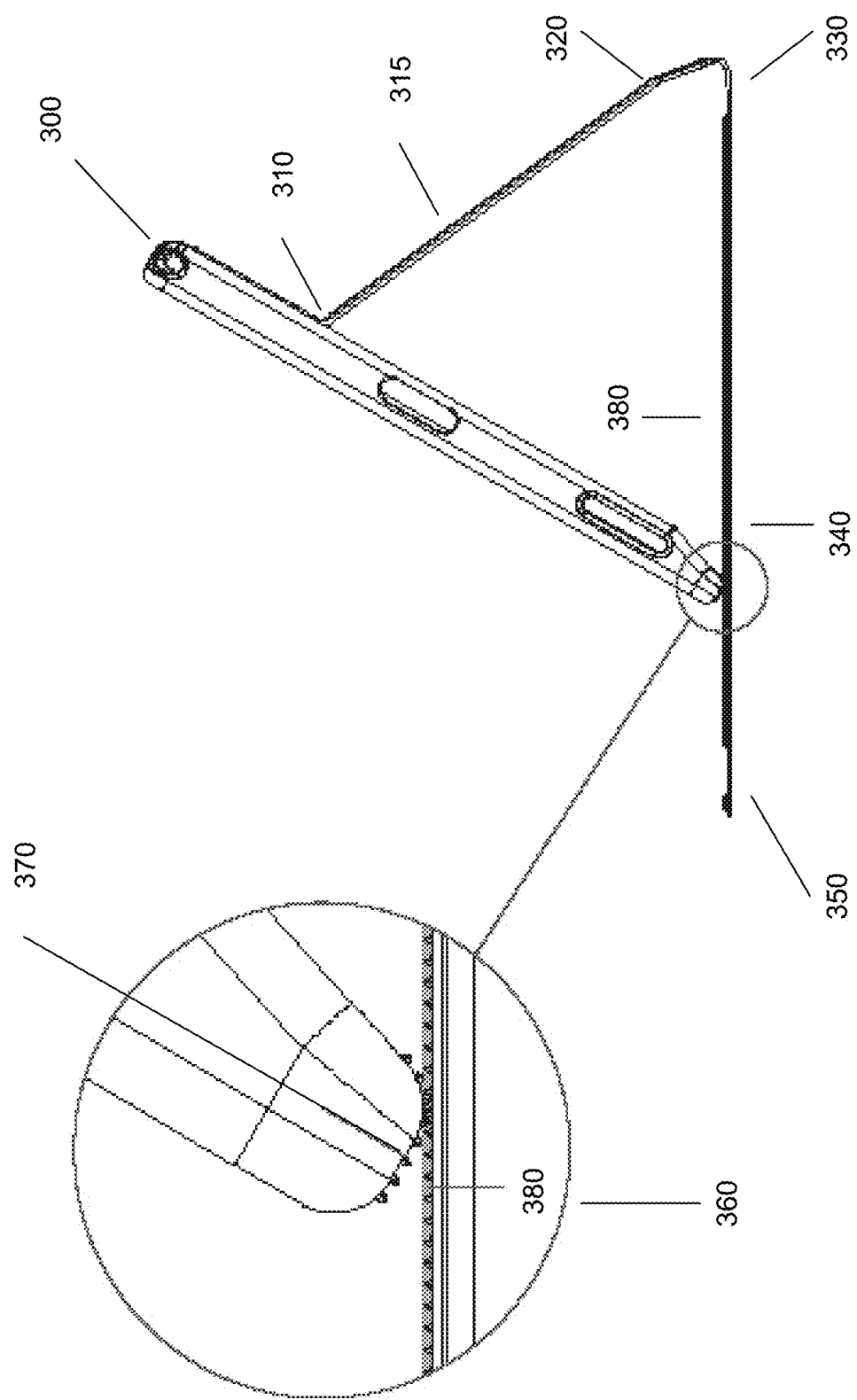
FIG. 3 illustrate a side view of an embodiment in use.

Information handling device circuitry, as for example outlined in FIG. 1 or FIG. 2, may be included in user devices such as tablet computing devices, smart phones, and the like and such devices may be placed in a case such as that shown in FIG. 3.

As illustrated in FIG. 3, an embodiment includes a case 300 into which the device is placed. Preferably case 300 is fabricated so that it envelopes the device, somewhat akin to a second skin. While body of the case may be made of any suitable material, a soft, pliable material is preferred. As shown in FIG. 3, the screen of the device would be on the left side of case 300. Connected to case 300 on the opposite side of the case (e.g., the rear of the case) is a protrusion which acts to wrap around the case and cover the screen of the device.

As shown in FIG. 3, the protrusion begin at a hinge-like point 310 (where the protrusion is pivotably attached to case 300) and continues at 315. Portion 315 essentially corresponds to the distance from hinge-like point 310 to the end of the case. There are then portions (320, 330) that act to wrap around the end of the case, then another portion 340 which covers the front of the case (e.g., the screen of the device contained within the case) and then a portion 350 which acts as a flap to close over the end of the case not enveloped by portions 320, 330.

As shown, the side of portion 340 that covers the front of the case (e.g., the screen of the device contained within the case), 380, contains a portion that is capable of adhering (through a fastener mechanism) to one side of the case body. An enlargement of the area in which 380 contacts the side of the case body appears at 360. As can be seen at 360, in one embodiment portion 380 is comprises little rubber like bumps (made of a rubber like or a plastic material) which mate with corresponding rubber like bumps 370 on the side of the case body. Bumps 370 may be placed on any portion of the side of the case, however, their effectiveness in acting as fastener is limited to those areas of the side of the case that will interact with the bumps located in area 380.

In the illustrated embodiment rubber bumps are used to create a reclosable and variable fastener mechanism, however, any appropriate fastening mechanism may be used. The bumps need not be made of rubber, but may be made of any suitable material. Other fastening mechanisms which may be used include a hook and loop fastener (e.g., VEL-CRO), a 3M Dual Lock Recloseable Fastener, and magnetized materials. (VELCRO is a registered trademark of Velcro Industries B.V. in the United States and other countries.) The important feature of the fastening system used is that it permits the user to select the point at which fastening occurs and, thus, select the viewing angle of the device.

As shown, area 380 does not extend all the way to the edge of the protrusion. This is a matter, however, of esthetic design choice as at some point bumps 370 will no longer provide sufficient contact with area 380 such that a tilted view will not be able to be maintained. In an embodiment, the end of the protrusion 350 is made of a flexible material such that it may wrap around the other side of case 300 and act as a flap to keep the protrusion (or cover) closed against the screen of the device contained within the case.

Figure 4:
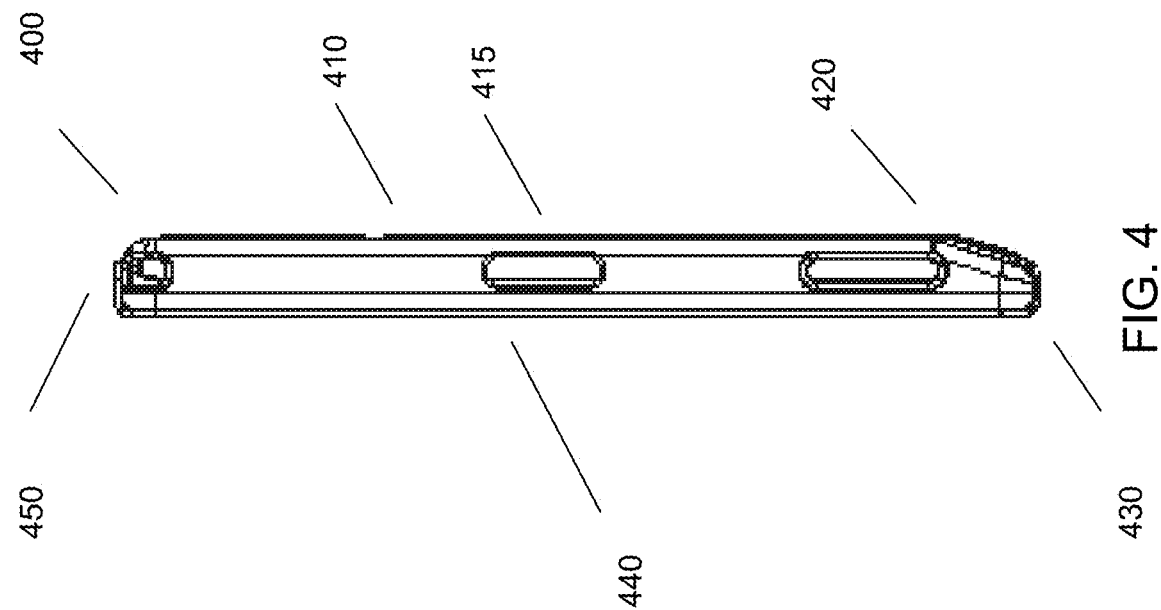
FIG. 4 illustrates a side view of an embodiment in a closed position.

Referring now to FIG. 4, a case is shown in the closed position (e.g., with the protrusion covering the screen of the device contained within the case). In this different view, the reference numerals have been incremented by 100 to identify components corresponding to those identified in FIG. 3. Case 400 is depicted, together with the protrusion begin at a hinge-like point 410 and continues at 415. Portion 415 essentially corresponds to the distance from hinge-like point 410 to the end of the case. There are then portions (420, 430) that act to wrap around the end of the case, then another portion 440 which covers the front of the case (e.g., the screen of the device contained within the case) and then a portion 450 which acts as a flap to close over the end of the case not enveloped by portions 420, 430.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An apparatus, comprising:
a receptacle for an information handling device having a user display, the receptacle having at least a first side, a second side, and at least one edge, wherein the first side of the receptacle has at least one opening therein through which the information handling device is insertable there-through and the second side forms a back of the receptacle; and
a protrusion that protrudes from the second side of the receptacle and is pivotably attached to the second side of the receptacle, said protrusion being of sufficient length to wrap around a bottom edge of the receptacle and cover the at least one opening in the first side of the receptacle;
wherein the bottom edge of the receptacle comprises a first plurality of substantially straight bumps that extend away from the bottom edge;
wherein the protrusion comprises an inner side and an outer side, wherein a majority of a portion of the inner side comprises thereon a second plurality of substantially straight bumps for engaging with the first plurality of substantially straight bumps that permit the bottom edge of the receptacle to be held in position, wherein the engaging comprises securing the first plurality of substantially straight bumps in recesses located between the second plurality of substantially straight bumps;
wherein the first plurality of substantially straight bumps are substantially similar in shape and dimension to the second plurality of substantially straight bumps.

2. The apparatus of claim 1, wherein the first and second plurality of substantially straight bumps comprise an interlocking fastening mechanism.

3. The apparatus of claim 2, wherein the interlocking fastening mechanism is a non-abrasive reclosable fastener.

4. The apparatus of claim 3, wherein the reclosable fastener is made of a material selected from the group consisting of rubber and plasticized material.

5. The apparatus of claim 1, wherein the second plurality of substantially straight bumps is positioned on only the portion of the protrusion.

6. The apparatus of claim 1, wherein the edge of the receptacle around which the protrusion wraps comprises an interlocking fastening mechanism.

7. The apparatus of claim 6, wherein the interlocking fastening mechanism is a reclosable fastener.

8. The apparatus of claim 1, wherein the first plurality of substantially straight bumps are bumps made of a material selected from the group consisting of rubber and plasticized material.

9. A system, comprising:
an information handling device comprising:
a display;
a processor; and
a memory device storing instructions executable by the processor to operatively couple the display to the processor;
a receptacle, the receptacle having at least a first side, a second side, and at least one edge, wherein the first side of the receptacle has at least one opening therein through which the information handling device is insertable there-through and the second side forms a back of the receptacle; and
a protrusion that protrudes from the second side of the receptacle and is pivotably attached to the second side of the receptacle, said protrusion being of sufficient length to wrap around a bottom edge of the receptacle and cover the at least one opening in the first side of the receptacle;
wherein the bottom edge of the receptacle comprises a first plurality of substantially straight bumps that extend away from the bottom edge;
wherein the protrusion comprises an inner side and an outer side, wherein a majority of a portion of the inner side comprises thereon a second plurality of substantially straight bumps for engaging with the first plurality of substantially straight bumps that permit the bottom edge of the receptacle to be held in position, wherein the engaging comprises securing the first plurality of substantially straight bumps in recesses located between the second plurality of substantially straight bumps;

wherein the first plurality of substantially straight bumps are substantially similar in shape and dimension to the second plurality of substantially straight bumps.

10. The system of claim 9, wherein the first and second plurality of substantially straight bumps comprise an interlocking fastening mechanism.

11. The system of claim 10, wherein the interlocking fastening mechanism is a non-abrasive reclosable fastener.

12. The system of claim 11, wherein the reclosable fastener is made of a material selected from the group consisting of rubber and plasticized material.

13. The system of claim 9, wherein the second plurality of substantially straight bumps is positioned on only the portion of the protrusion.

14. The system of claim 9, wherein the edge of the receptacle around which the protrusion wraps comprises an interlocking fastening mechanism.

15. The system of claim 14, wherein the interlocking fastening mechanism is a reclosable fastener.

16. The system of claim 9, wherein the first plurality of substantially straight bumps are bumps made of a material selected from the group consisting of rubber and plasticized material.

* * * * *